Patented June 9, 1931

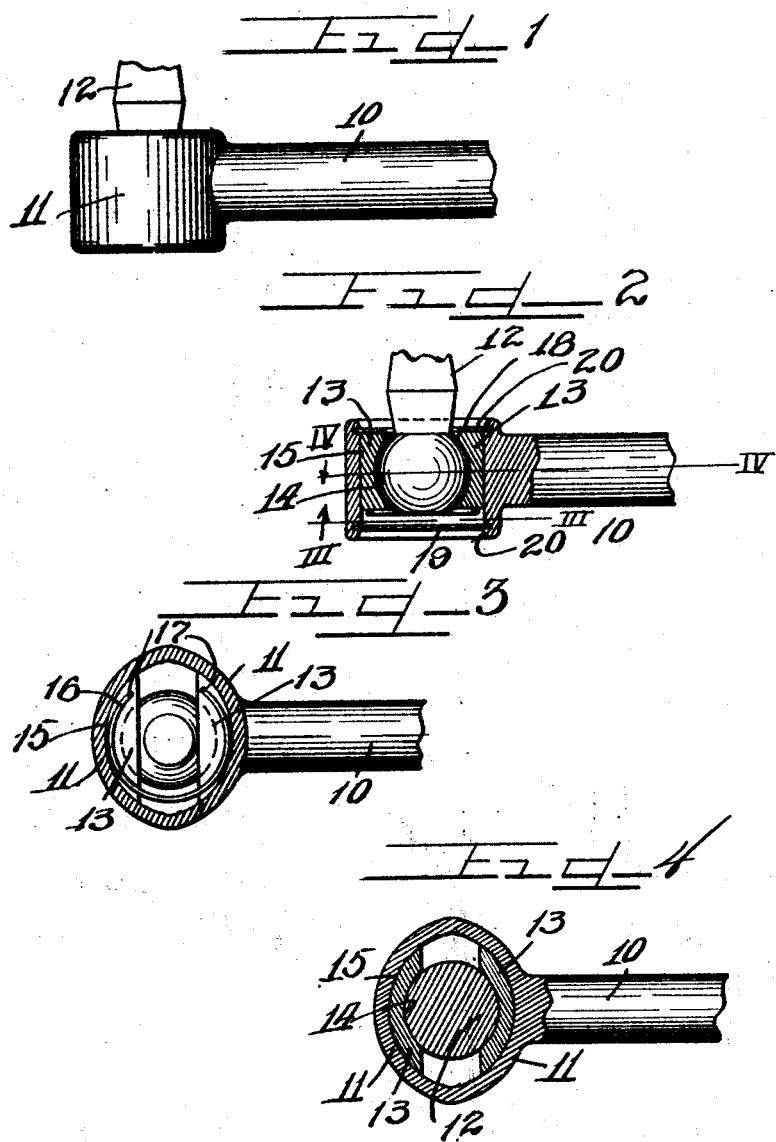

1,809,703

UNITED STATES PATENT OFFICE

GEORGE H. HUFFERD AND MATTHEW P. GRAHAM, OF DETROIT, MICHIGAN, ASSIGNORS TO THOMPSON PRODUCTS, INC., OF CLEVELAND, OHIO, A CORPORATION OF OHIO

BALL JOINT CONNECTION

Application filed October 26, 1928. Serial No. 315,208.

This invention relates to an improved ball joint for connecting links, tie rods, and drag links, which is inherently self-adjusting for wear.

It is an object of this invention to provide an improved and simplified ball joint wherein a minimum of relative movement will produce the maximum of adjustment while being self locking against loosening due to a reverse movement of the adjusting means. The present invention relates to a variation of an earlier form of wedging self-adjusting ball joint as disclosed in the Hufferd application S. N. 139,267 wherein curved ball seats tapered in cross-section are shifted within a cylindrical surface to vary the bearing adjustment. The present invention increases the sensitiveness of adjustment by making the ball seats symmetrical relative to the axis of the ball stud and forming the enveloping housing as two arcuate surfaces with offset or overlapping centers whereby a crosswise movement of the ball seat members will result in a converging movement of the bearing seats. This construction maintains a full bearing surface in the ball seat bearings regardless of the extent of movement of the seat members.

Other and further important objects of this invention will be apparent from the disclosures in the specification and accompanying drawings.

The invention (in a preferred form) is illustrated on the drawings and hereinafter more fully described.

On the drawings:

Figure 1 is a side elevation of a ball joint embodying the features of this invention.

Figure 2 is a longitudinal vertical section through the ball joint of Figure 1.

Figure 3 is a horizontal section on the line III—III of Figure 2.

Figure 4 is a section on the line IV—IV of Figure 2.

As shown on the drawings:

The structure chosen as the illustrative embodiment of this invention comprises a fragmentary portion of a tie rod or drag link 10 the end of which is formed into an integral eye roughly elliptical in shape with the major axis at right angles to the axis of the tie rod. Such an eye is perhaps best made initially in the form of a cylinder which is then upset to form two intersecting segmental cylindrical shells 11 the axes of which are on opposite sides of the major axis in an overlapping relationship. Thus each side of the major axis of the rough ellipse is composed of a circular segment, the two segments forming a shell or housing for the bearing proper.

A ball stud 12, having a ball on the lower end thereof, is journalled between a pair of formed ball seat members 13 which are provided with spherical inner bearing surfaces 14 engaging the ball and with cylindrical outer surfaces 15 of the same radius as the shell or housing. These ball seat members are so formed when new as to engage the ball and fill the housing when the ball is aligned with the tie rod, i. e. in the minor axis of the roughly elliptical shell or housing.

A consideration of the geometry of the lay out will make it evident that this is the position for the greatest separation of the spherical bearing surfaces 14. If the two ball seat members are rotated about the axes of their outer surfaces, in other words shifted crossways in the shell or housing, the space between the spherical bearing surfaces will be decreased. In order to accomplish this shift automatically a curved spring 16 is provided with hook ends 17 adapted to engage in apertures in one end of the ball seat members, the spring being preferably maintained in compression so as to separate the upper edges of the ball seat members as shown in Figure 3. However, the spring may be maintained in tension to draw these edges together if desired as either direction of movement of the ball seat members will provide an adjustment to compensate for wear of the ball and ball seat bearing surfaces, or for initial inaccuracies in the manufacture thereof.

In order to retain the assembly of ball and ball seat members in the shell or housing, the latter is formed with inner stepped recesses at the top and bottom. This top recess receives an annular disc 18 surrounding the neck of the ball stud, and the bottom recess receives a solid disc 19 after which the edges of the recess are spun or bent over to hold the discs in place as indicated by the numeral 20 in Figure 2.

It will thus be seen that we have produced an improved and simplified ball joint that will be self-adjusting and trouble proof in service and that is constructed with the minimum of parts which are symmetrical and interchangeable.

We are aware that numerous details of construction may be varied through a wide range without departing from the principles of this invention, and we therefore do not purpose limiting the patent granted, otherwise than necessitated by the prior art.

We claim as our invention:

1. In a ball joint, a spherical member, separated seat members engaging said spherical member on opposite sides thereof and having outer cylindrical surfaces and a symmetrical housing having cylindrical surfaces eccentric with respect to each other and to said spherical member and engaging the cylindrical surfaces of said seat members and resilient means urging said seat members in opposite directions circumferentially of said spherical member.

2. In a ball joint, a ball stud, separated seat members affording ball seats on their inner faces and having outer cylindrical surfaces the axes of which lie on the farther sides respectively of the center of said ball, a housing having inner cylindrical surfaces conforming and in contact with said first mentioned cylindrical surfaces and means resiliently cooperating with said seat members and tending to effect relative rotative movement thereof about said ball.

3. In a ball joint, a ball stud, separated seat members affording ball seats on their inner faces and having outer cylindrical surfaces the axes of which lie on the farther side respectively of the center of said ball, a housing having inner cylindrical surfaces conforming and in contact with said first mentioned cylindrical surfaces, and provided with inner annular recesses at the respective ends thereof, a solid disc supported in one of said recesses and an annular disc supported in said other recess and means resiliently cooperating with said seat members to effect relative rotative movement thereof about said ball.

4. A ball joint connection comprising a ball stud, a housing for the ball thereof having oppositely disposed doubly converging arcuate surfaces, said surfaces being symmetrical with respect to a plane passing through the lines formed by the intersections of said surfaces, spaced ball seat members conforming and in contact with said ball end and with said arcuate surfaces and means resiliently urging said ball seats circumferentially of said ball end to effect closer engagement therewith.

In testimony whereof we have hereunto subscribed our names at Detroit, Wayne County, Michigan.

GEORGE H. HUFFERD.
MATTHEW P. GRAHAM.